W. B. GOODWIN.
TRANSMISSION MECHANISM FOR MOTOR VEHICLES.
APPLICATION FILED DEC. 5, 1914.

1,212,627.

Patented Jan. 16, 1917.

Witnesses

Inventor
William B. Goodwin
By Walter F. Murray
Attorney

UNITED STATES PATENT OFFICE.

WILLIAM B. GOODWIN, OF COLUMBUS, OHIO.

TRANSMISSION MECHANISM FOR MOTOR-VEHICLES.

1,212,627.   Specification of Letters Patent.   Patented Jan. 16, 1917.

Application filed December 5, 1914. Serial No. 875,555.

*To all whom it may concern:*

Be it known that I, WILLIAM B. GOODWIN, a citizen of the United States of America, and resident of Columbus, county of Franklin, State of Ohio, have invented certain new and useful Improvements in Transmission Mechanisms for Motor-Vehicles, of which the following is a specification.

This invention relates to improvements in transmission mechanisms for motor vehicles and particularly to transmission mechanisms for vehicles of the type illustrated and described in my co-pending application filed December 22, 1913, and serially numbered 808,083.

In vehicles of the above mentioned type, the body, engine, and gear shifting mechanisms are mounted on the main or primary chassis or frame, and the wheels and running gear of the vehicle are mounted upon separate or secondary chassis located at each end of the primary chassis, in such a manner that each secondary chassis has movement, both rotative and longitudinal, with relation to the body chassis. For this reason it is absolutely essential that an extremely flexible driving shaft or transmission be provided to communicate the driving power of the engine to the rear or driving axle of the machine.

Figure 1:
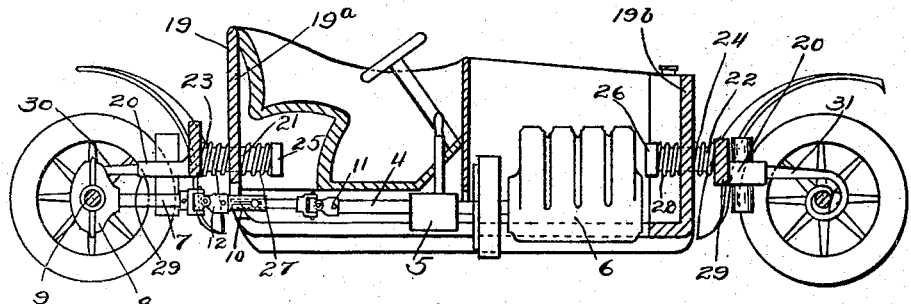
Figure 2:
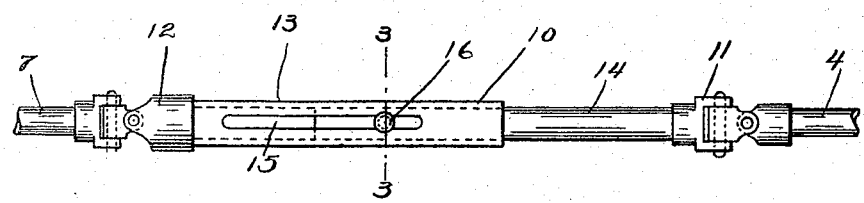
Figure 4:
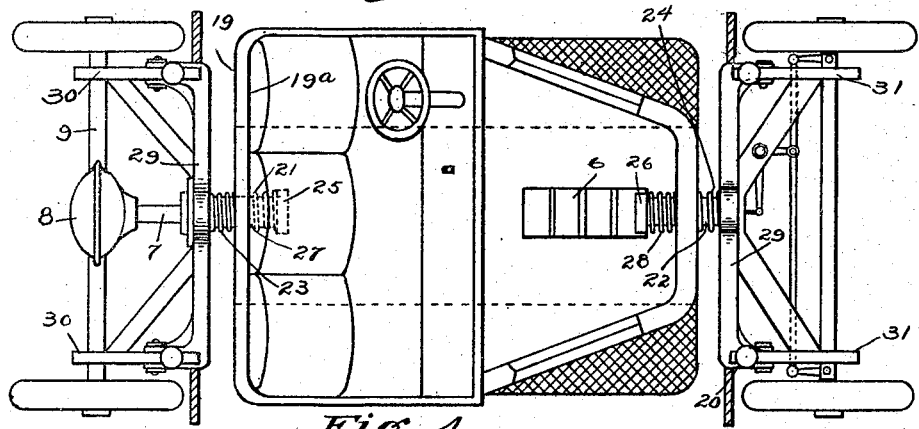
Figure 3:
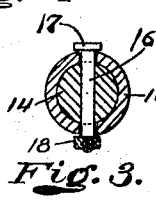

I have therefore devised the construction herein illustrated and described in which the object is to produce a transmission mechanism for motor vehicles in which the driving axle of the machine is so constructed with relation to the body and engine carrying chassis or frame, that movement of the driving axle in all directions with relation to the body and engine carrying chassis, is permitted, without imposing excessive twisting or bending strains on the operating mechanism and other parts of the car. This and other objects are attained in the apparatus described in the following specification and illustrated in the accompanying drawings in which;

Figure 1 is a sectional side elevation of a motor vehicle of the type set forth in my above mentioned co-pending application, showing transmission mechanism embodying my present invention, mounted thereon. Fig. 2 is a fragmental side elevation of the transmission illustrated in Fig. 1, but showing same upon a somewhat enlarged scale. Fig. 3 is a sectional view taken on the line 3—3 of Fig. 2. Fig. 4 is a plan view of the vehicle shown in Fig. 1.

The parts shown in my co-pending application above referred to, consist of a primary or body carrying chassis 19, to each end of which a secondary or wheel carrying chassis 20 is secured. Each secondary chassis may be pivotally secured to the ends of the primary chassis by means of journal pins 21 and 22, which are rotatively mounted in bearings provided in the primary chassis. Mounted on these journal pins between each secondary chassis and the primary chassis are springs 23 and 24, while between heads 25 and 26 formed on the inwardly projecting ends of the pins, and the inner faces of the vertically extending portions 19ᵃ and 19ᵇ of the primary chassis, are located springs 27 and 28. Each secondary chassis consists of a bolster 29 which bears one of the journal pins 21 and 22 between its ends, while at each end thereof, spring arms 30 and 31 are mounted.

The transmission embodying my invention consists of a shaft or driving member 4 which communicates with the gear box 5 and motor 6 of the vehicle, a shaft or driven member 7 which communicates with the differential 8 and rear axle 9, a telescopic intermediate shaft or member 10, and universal joints 11 and 12 connecting the shafts 4 and 7 respectively, with the intermediate shaft 10. The intermediate shaft 10 consists of a sleeve member 13 and a solid member 14 adapted to telescope with the sleeve. The sleeve is provided with slots 15 in which a pin 16 mounted in the solid member 14, is adapted to slide. The pin 16 is provided with headed ends 17 and 18 for the purpose of preventing its disengagement from the slots 15 during telescopic movement of the portions 13 and 14. The universal joint 12 between the sleeve 13 of the shaft 10 and the shaft 7, permits of angular movement of the shaft 10 with shaft 7 and the universal joint 11 connecting the shaft 4 with the solid portion 14 of the shaft 10, permits of angular movement of the two shafts 4 and 10, the shaft 4 moving with the engine and body, and the shaft 7 moving with the differential 8 and rear axle 9, to give a double universal action, as it were, to the shafts 4, 7 and 10. Because of the fact that forward and backward movement of each secondary chassis with relation to the primary or body carrying chassis, is provided for, it is necessary that some kind of telescopic construction of at least one of the shafts 4, 7 or 10, be provided for. The shaft 10 has been provided therefore with a form of telescopic construction. This construction, however, may be varied, since any suitable form of telescoping shaft construction may be substituted, and any suitable form of universal joint construction, other than the construction illustrated, may be provided. Under some circumstances it may be desirable to employ but one universal joint to accommodate angular movement of the shaft, but I prefer to employ the construction illustrated.

In operation: When the vehicle equipped with my improved transmission, is traveling along the road, and encounters an obstruction which tends to raise the front and rear wheels with relation to the body, angular movement of the shaft 7 with relation to the shaft 4 is permitted, without imparting to these shafts or to any other portion of the vehicle, undue strains which would tend to weaken the construction. At the same time that these upward and downward movements of the wheels take place, the secondary chassis at each end of the primary chassis, is subjected to a more or less severe shock, tending to move them forward or backward with relation to the body or primary chassis. This forward and backward movement of the secondary chassis with relation to the body chassis is permitted by the telescopic construction of the driving shaft 10, the solid portion 14 thereof telescoping with the sleeve 13, without any cessation of driving power to the rear axle. It will thus be seen that movement of the rear axle both upwardly and downwardly as well as forwardly and backwardly with relation to the body chassis, is permitted by my improved transmission construction.

Having thus described my invention, what I claim is:

1. In combination in a motor vehicle, a body chassis, a running gear chassis, an engine mounted on the body chassis, a driving axle mounted on the running gear chassis, means connecting the running gear chassis to the primary chassis and adapted to permit relative longitudinal and rotatory motion of said chassis, means for movably mounting said driving axle relatively to said running gear chassis, a driving shaft connecting with said engine, a driven shaft connecting with said driving axle and movable therewith, and an intermediate telescopic shaft connected with said driving and said driven shafts and adapted to permit relative movement of said driving axle and driven shaft with said engine and said driving shaft.

2. A motor vehicle comprising a body chassis, a running gear chassis yieldingly secured to the body chassis beyond the limits thereof, an engine mounted on said body chassis, a driving shaft connected with said engine, a driven shaft mounted on said running gear chassis, and means connecting said driving and driven shafts and adapted to permit relative movement of said chassis.

In testimony whereof, I have hereunto subscribed my name this third day of December, 1914.

WILLIAM B. GOODWIN.

Witnesses:
WALTER F. MURRAY,
W. THORNTON BOGERT.

Copies of this patent may be obtained for five cents each, by addressing the "Commissioner of Patents, Washington, D. C."